United States Patent
Schmackpfeffer et al.

(10) Patent No.: US 12,474,931 B2
(45) Date of Patent: Nov. 18, 2025

(54) OPERATING SYSTEM LEVEL DYNAMIC LIGHTING CONTROL

(71) Applicant: Logitech Europe S.A., Lausanne (CH)

(72) Inventors: Adam Michael Schmackpfeffer, Buda, TX (US); Andrew Douglas Coonrad, Santa Cruz, CA (US); Jules Antoine Moretti, Los Angeles, CA (US); Christopher Ian Hughes, Oakland, CA (US)

(73) Assignee: Logitech Europe S.A., Lausanne (CH)

( * ) Notice: Subject to any disclaimer, the term of this patent is extended or adjusted under 35 U.S.C. 154(b) by 100 days.

(21) Appl. No.: 18/381,084

(22) Filed: Oct. 17, 2023

(65) Prior Publication Data

US 2025/0123850 A1    Apr. 17, 2025

(51) Int. Cl.
  *G06F 9/4401*   (2018.01)
  *G06F 3/0481*   (2022.01)
  *G06F 9/455*    (2018.01)

(52) U.S. Cl.
  CPC .......... *G06F 9/4411* (2013.01); *G06F 3/0481* (2013.01); *G06F 9/455* (2013.01)

(58) Field of Classification Search
  CPC ..... G06F 9/4411; G06F 3/0481; G06F 9/9455
  See application file for complete search history.

(56) References Cited

U.S. PATENT DOCUMENTS 10,205,606 B2 *   2/2019   Klitenik ............. H05B 47/1965
11,758,035 B2 *   9/2023   Nadathur .......... H04M 1/72448
                                                          710/8

* cited by examiner

*Primary Examiner* — Tammara R Peyton
(74) *Attorney, Agent, or Firm* — Patterson + Sheridan, LLP

(57) ABSTRACT

Techniques for device lighting control are disclosed. These techniques include obtaining exclusive access to a device driver for a dynamic lighting device and instructing the device driver to create a virtual device instance for the dynamic lighting device. The techniques further include controlling dynamic lighting for the dynamic lighting device using the device driver and the virtual device instance. This includes receiving at the virtual device instance dynamic lighting data from one or more operating system (OS) dynamic lighting controls and translating OS dynamic lighting commands for a device specific interface relating to the dynamic lighting device.

17 Claims, 8 Drawing Sheets

OPERATING SYSTEM LEVEL DYNAMIC LIGHTING CONTROL

BACKGROUND

Field

Embodiments of the present disclosure generally relate to dynamic lighting control, and more specifically at least some embodiments relate to operating system level dynamic lighting control for peripheral devices.

Description of the Related Art

Lighting support for peripheral devices has traditionally been supplied by developers of the peripheral devices. But this functionality is being added at an operating system (OS) level, for some implementations. For example, Microsoft Windows is adding OS-level support for red-green-blue (RGB) dynamic lighting, using a human-interface-device (HID) standard termed LampArray. This requires significant changes from peripheral developers (e.g., developers of computing peripherals with RGB lighting features) to support both the Windows standard and advanced features provided directly by the peripheral developers. In particular, it is a challenging problem to support legacy devices wishing to use the LampArray standard, without hampering existing functionality, while also seamlessly providing full features for future devices.

SUMMARY

Embodiments include a computer-implemented method. The method includes obtaining exclusive access to a device driver for a dynamic lighting device. The method further includes instructing the device driver to create a virtual device instance for the dynamic lighting device. The method further includes controlling dynamic lighting for the dynamic lighting device using the device driver and the virtual device instance. This includes receiving at the virtual device instance dynamic lighting data from one or more operating system (OS) dynamic lighting controls and translating OS dynamic lighting commands for a device specific interface relating to the dynamic lighting device.

Embodiments further include a system, including one or more processors and one or more memories storing a program, which, when executed on any combination of the one or more processors, performs operations. The operations include obtaining exclusive access to a device driver for a dynamic lighting device. The operations further include instructing the device driver to create a virtual device instance for the dynamic lighting device. The operations further include controlling dynamic lighting for the dynamic lighting device using the device driver and the virtual device instance. This includes receiving at the virtual device instance dynamic lighting data from one or more OS dynamic lighting controls and translating OS dynamic lighting commands for a device specific interface relating to the dynamic lighting device.

Embodiments further include a non-transitory computer-readable medium containing computer program code that, when executed by operation of one or more computer processors, performs operations. The operations include obtaining exclusive access to a device driver for a dynamic lighting device. The operations further include instructing the device driver to create a virtual device instance for the dynamic lighting device. The operations further include controlling dynamic lighting for the dynamic lighting device using the device driver and the virtual device instance. This includes receiving at the virtual device instance dynamic lighting data from one or more OS dynamic lighting controls and translating OS dynamic lighting commands for a device specific interface relating to the dynamic lighting device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
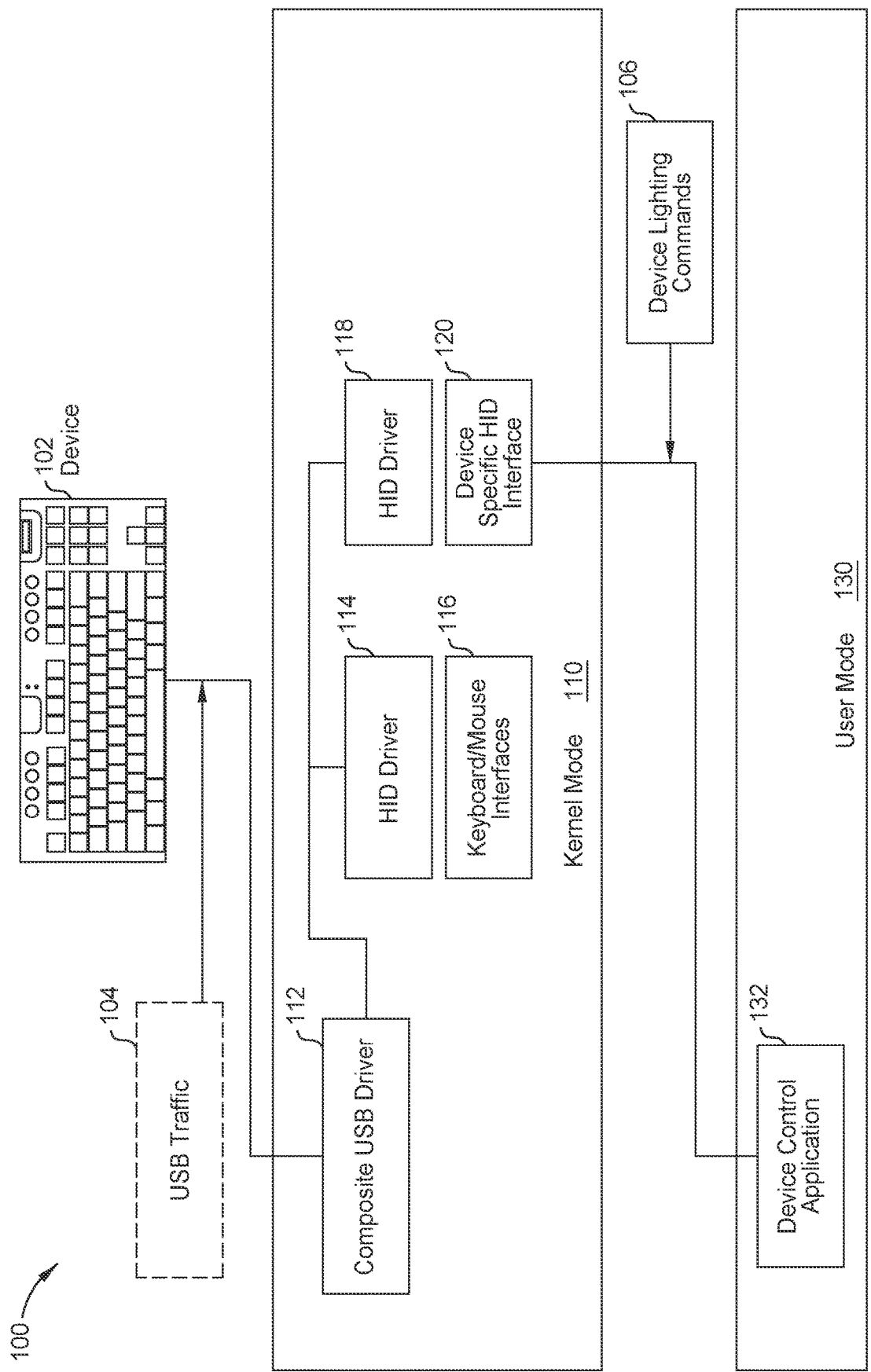
FIG. 1 illustrates a block diagram for dynamic lighting control, according to one embodiment.

Dynamic lighting support is generally being added at an OS-level, which creates significant challenges for developers of peripherals with dynamic lighting features. One possible solution would be to update the peripheral devices themselves to support OS-level dynamic lighting. For example, peripheral device firmware could be updated to provide OS-level dynamic lighting support. However, this approach has several potential drawbacks. For example, this requires updating the firmware on every peripheral device on the market, which is time-consuming, computationally expensive, and prone to errors. Particularly for peripheral developers with a large installed base, requiring a firmware update on a very large number of devices requires significant computational power to handle the updates, and is likely to lead to numerous update errors and users that decline to update or are unable to update, along with other problems. Further, firmware code often has significant legacy aspects, making it typically very complex and prone to unexpected behavior. Even where firmware updates are successful, revisions to firmware create a risk of unforeseen bugs and other problems impacting the user experience. And requiring firmware updates means that many users will be without OS-level dynamic support for a lengthy period, while they wait for the update process to complete.

One or more techniques described herein avoid at least some of these drawbacks by implementing OS-level dynamic lighting support in software, through a combination of an improved device driver and software lighting service. In an embodiment, the lighting service can create a virtual lighting device to interact with the OS-level controls, while acting to translate lighting commands between manufacturer specific and OS-specific implementations. The same lighting service can act both to facilitate input from a dynamic lighting device to the OS, and to translate output from the OS to the dynamic lighting device. Further, one or more of these techniques allow for seamless switching of dynamic lighting control between a developer-specific device control application, and an OS-specific dynamic lighting control. These techniques are discussed further, below, with regard to FIGS. 2-8.

In an embodiment, one or more of these techniques has significant technical advantages. For example, the OS-specific dynamic lighting support can be implemented through a software update to a computing device (e.g., an OS and developer-specific control application) rather than a firmware update to the dynamic lighting devices themselves. This is much less computationally expensive, in terms of development time and resources. For example, it requires significantly more developer resources, including computational resources, to prepare numerous firmware updates for the dynamic lighting devices as opposed to a software update for the computing device.

As another example, implementation through a software update is significantly less error prone and more user friendly. The update process for computing devices (e.g., the OS device driver update process) is generally much more streamlined and robust than the firmware update process, and software level updates are typically less complex to develop and distribute than firmware updates, and less prone to bugs and unexpected errors. As a further example, a software update provides for much more rapid support for a large number of users, by allowing customers to update through a device driver update process rather than a more complex and difficult firmware update process. Finally, one or more embodiments described below allow a user to access OS-level dynamic lighting control without requiring installation of a developer-specific device control application. For example, as discussed below in relation to FIGS. 2-3, a user can access OS-level dynamic lighting control through a combination of an improved device driver and software lighting service, without a developer-specific device control application. This provides a substantial advantage, because it both allows for a uniformly improved user experience and reduces development and debugging time, by providing a consistent implementation for OS-level dynamic lighting control even if a user does not install a developer-specific device control application.

While embodiments herein are illustrated using Windows dynamic lighting and the LampArray function, this is merely an example. One or more of these techniques can be applied to any suitable OS and any suitable computing system. Further, dynamic lighting control is merely one example. One or more of these techniques could be applied for software-based support of OS-level control of peripheral devices. For example, one or more of these techniques could be applied to audio endpoints, video endpoints, illumination devices, or any other suitable devices.

FIG. 1 illustrates a block diagram for dynamic lighting control, according to one embodiment. In an embodiment, a computing environment 100 supports a Microsoft Windows OS and includes a device 102 that supports dynamic lighting. For example, the device 102 can be a keyboard, a mouse, a gaming controller (e.g., a gamepad, controller, wheel, joystick, or any other suitable gaming controller), an audio device (e.g., a headset or speaker), or any other suitable device. In an embodiment, the lighting associated with the device 102 (e.g., the color(s) displayed at a given time) can be controlled by an associated computer. For example, the lighting can be controlled to match a computer gaming environment, or any other suitable computer application, to enhance the user experience. Microsoft Windows is merely one example, and the techniques disclosed herein can be applied to any suitable OS and computing environment (e.g., a laptop computer, a desktop computer, a smartphone, a tablet, a wearable device, an Internet of Things (IoT) device, or any other suitable computing environment).

In existing systems, a device 102 typically interfaces with a Microsoft Windows computing system using a combination of a composite USB driver 112 (e.g., a Microsoft composite USB driver), one or more human interface device (HID) drivers 114 and 118 (e.g., Microsoft HID drivers) and keyboard/mouse interfaces 116. For example, USB traffic 104 relating to operation of the device 102 is routed through the composite USB driver 112 in a kernel mode 110. In an embodiment, a processor in a computing system running Microsoft Windows typically operates in two different modes: a kernel mode 110 and a user mode 130. The modes both run at all times, and operate independently of each other. Applications typically run in the user mode 130, while core OS components typically run in the kernel mode 110. In typical systems, many device drivers run in the kernel mode 110, but some run in the user mode 130.

In an embodiment, the USB traffic 104 both controls the operation of the device, and controls the RGB lighting features. For example, a device control application 132 running in the user mode 130 can provide device lighting commands 106 to a device-specific HID interface 120 in the kernel mode 110. The device-specific HID interface 120 can route these lighting commands through the HID driver 118 and the composite USB driver 112 (e.g., as USB traffic 104), to control the RGB lighting effects of the device 102.

As one example, assume a user attaches a device 102 to a computing system. When the device 102 is attached, the OS (e.g., Microsoft Windows) detects the device 102 and uses the composite USB driver 112 and one or more of the HID drivers 114 to control the device. The OS further makes the device-specific HID interface 120 available to applications (e.g., the device control application 132) to control the lighting effects. As discussed above, the device control application 132 can then route commands to the device 102 through the device-specific HID interface 120, the HID driver 118, and the composite USB driver 112, and can receive status updates and confirmations from the device 102 through the same path.

In an embodiment, this solution illustrated in the computing environment 100 relies on generalized composite USB drivers and HID drivers and does not support built in OS level support for dynamic lighting. FIGS. 2-8, below, illustrate additional solutions to support OS level lighting controls (e.g., built-in Windows dynamic lighting controls).

Figure 2:
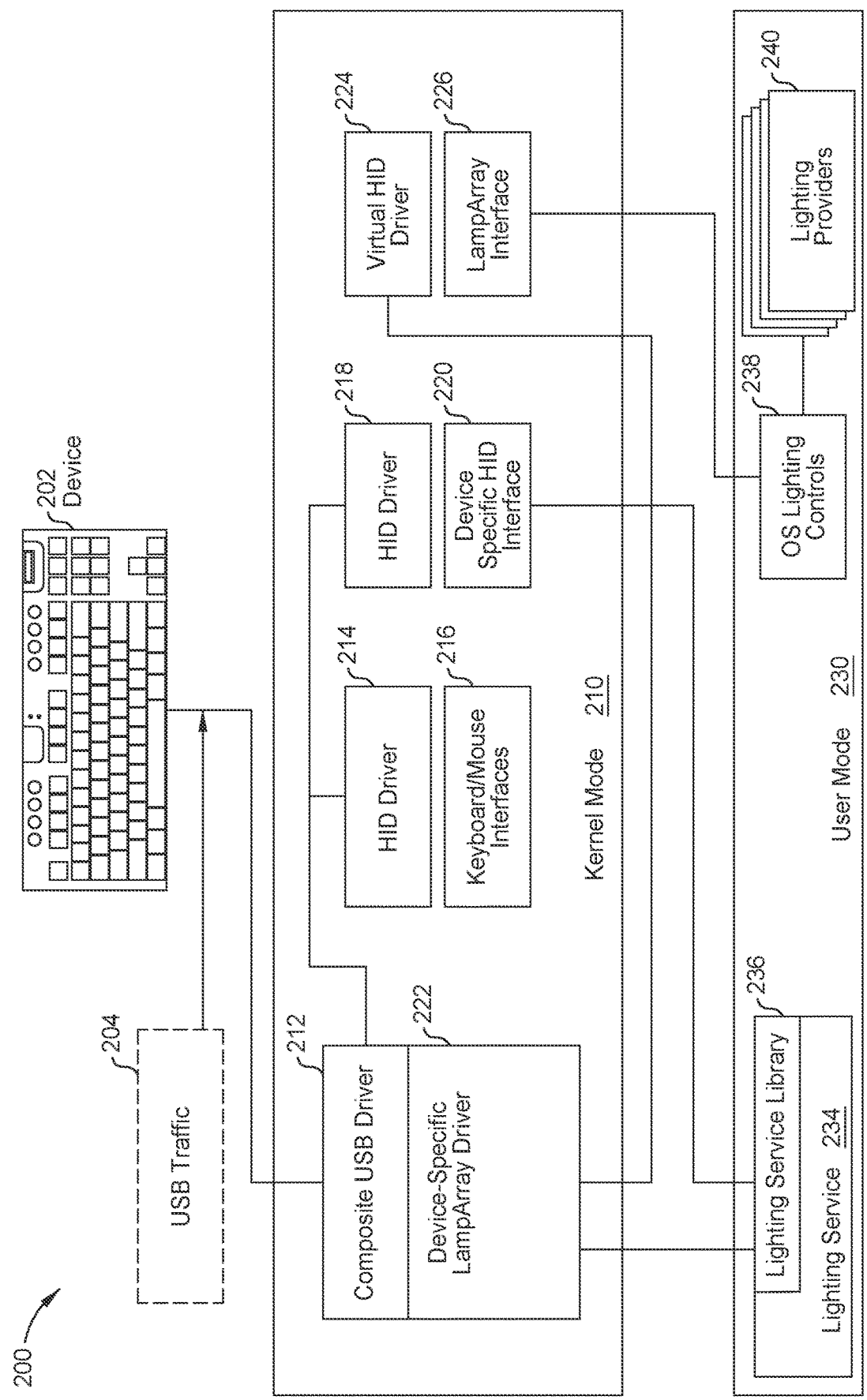
FIG. 2 illustrates a block diagram for OS-level dynamic lighting control, according to one embodiment.

FIG. 2 illustrates a block diagram for OS-level dynamic lighting control, according to one embodiment. In an embodiment, FIG. 2 illustrates a computing environment 200, like the computing environment 100 illustrated in FIG.

1, with added support for OS-level dynamic lighting control. As in FIG. 1, above, in an embodiment the computing environment 200 supports a Microsoft Windows OS and includes a device 202 that receives and transmits USB traffic 204 and supports dynamic lighting (e.g., a keyboard, a mouse, a gaming controller, an audio device or any other suitable device). Microsoft Windows is merely one example, and the techniques disclosed herein can be applied to any suitable OS and computing environment. In an embodiment, the lighting associated with the device 202 (e.g., the color(s) displayed at a given time) can be controlled by an associated computer. For example, the lighting can be controlled to match a computer gaming environment, or any other suitable computer application, to enhance the user experience.

The computing environment 200 includes a kernel mode 210 with a composite USB driver 212, HID drivers 214 and 218, keyboard/mouse interfaces 216, and device-specific HID interfaces 220. The computing environment 200 further includes OS-level dynamic lighting control through the device-specific LampArray driver 222 (e.g., a LampArray driver provided by the device manufacturer) and the OS lighting controls 238 (e.g., Windows lighting controls associated with lighting providers 240), which interact with a lighting service 234 (e.g., including a lighting service library 236), a virtual HID driver 224, and a LampArray interface 226.

As discussed above, rather than updating firmware on the device 202 to support OS-level dynamic lighting control, the computing environment 200 adds software level support in the kernel mode 210 and user mode 230. In an embodiment, the computing environment 200 includes a lighting service 234 which facilitates OS-level dynamic lighting control. For example, the lighting service 234 creates a virtual HID driver 224 (e.g., associated with a LampArray interface 226) to interact with the device-specific LampArray driver 222, and translates OS lighting controls 238 into device-specific HID commands. This is discussed in more detail, below, with relation to FIG. 3.

Figure 3:
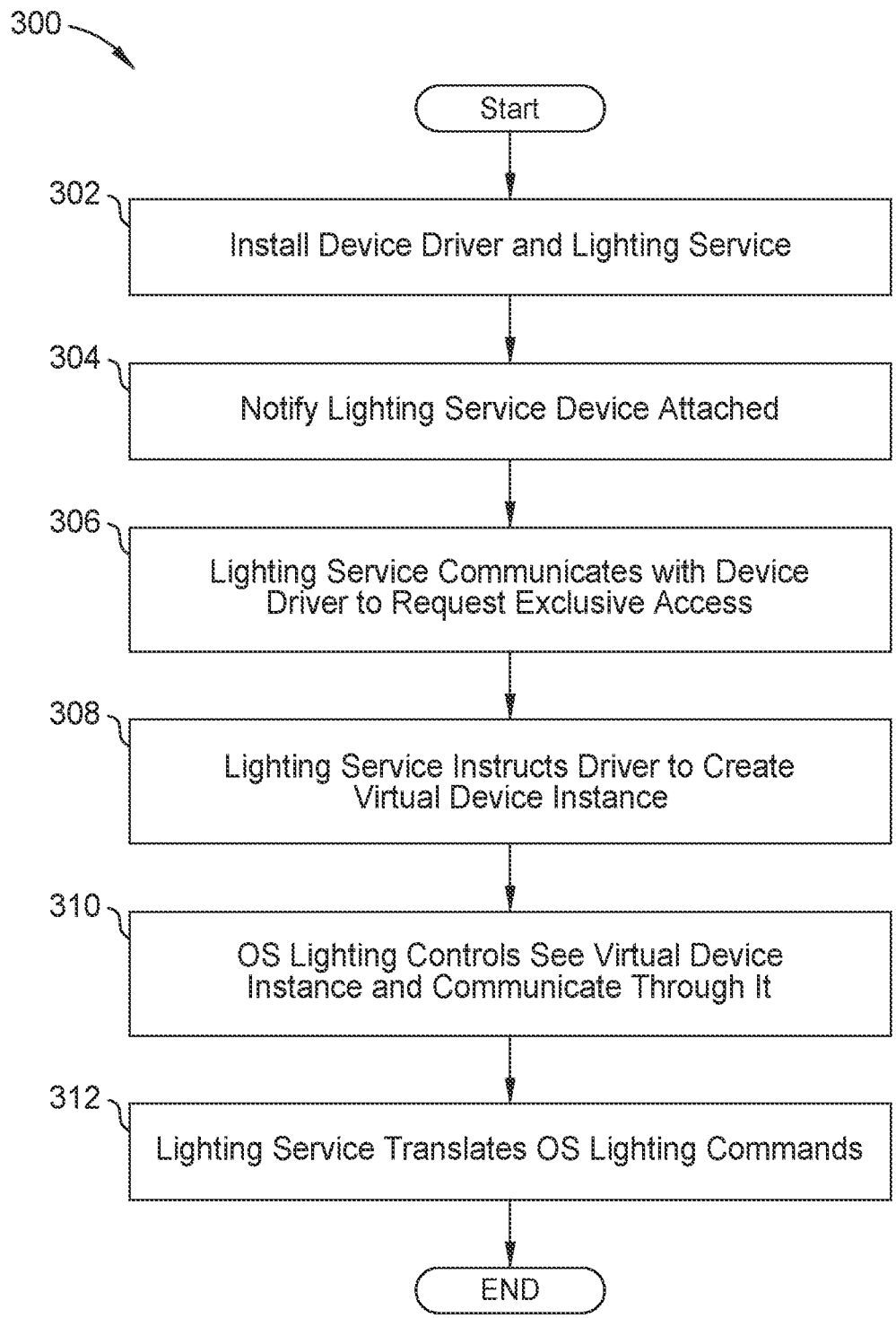
FIG. 3 is a flowchart illustrating OS-level dynamic lighting control, according to one embodiment.

FIG. 3 is a flowchart 300 illustrating OS-level dynamic lighting control, according to one embodiment. As discussed above, in an embodiment the flowchart 300 illustrates OS-level dynamic lighting control using the computing environment 200 illustrated in FIG. 2. At block 302, a user installs a device driver and lighting service. For example, a user can connect a dynamic lighting device (e.g., the device 202 illustrated in FIG. 2) to a computing system. The computing system can automatically retrieve, and install, a device driver (e.g., the device-specific LampArray driver 222 illustrated in FIG. 2) in a kernel mode (e.g., the kernel mode 210 illustrated in FIG. 2) and a lighting service (e.g., the lighting service 234 illustrated in FIG. 2) in a user mode (e.g., the user mode 230 illustrated in FIG. 2).

Further, where the computing system has an existing dynamic lighting device connected, the computing system can update an existing device driver to provide OS-level dynamic lighting support. In an embodiment, the computing system can retrieve the device driver and lighting service from a suitable repository (e.g., a remote repository) using a suitable communication network (e.g., the Internet, a wide area network (WAN), a local area network (LAN), a cellular network, or any other suitable communication network).

At block 304, the computing system notifies the lighting service that a device is attached. For example, the device or another aspect of the computing system (e.g., an OS service or component) can notify the lighting service that a device is attached.

At block 306 the lighting service communicates with the device driver to request exclusive access for dynamic lighting. For example, in the computing environment 200 illustrated in FIG. 2, the lighting service 234 can communicate with the device-specific LampArray driver 222 and request exclusive access to controlling dynamic lighting support for the device 202.

At block 308, the lighting service instructs the driver to create a virtual device instance in the system. In an embodiment, the lighting service receives exclusive access to controlling dynamic lighting support for the device (e.g., as discussed above in relation to block 306), and then instructs the driver to create the virtual device. Returning to the computing environment 200 illustrated in FIG. 2, the lighting service 234 receives exclusive access to controlling dynamic lighting support (e.g., from the device-specific LampArray driver 222), and then instructs the device-specific LampArray driver 222 to create the virtual HID driver 224 with an associated LampArray interface 226.

At block 310, the OS lighting controls see the virtual device instance and communicate through it. Using the computing environment 200 illustrated in FIG. 2 as an example, the OS lighting controls 238 see the virtual HID driver 224 and communicate dynamic lighting commands and data through the LampArray interface 226.

At block 312, the lighting service translates OS lighting commands. In an embodiment, the lighting service reads lighting commands from the OS lighting controls, and translates them (e.g., into device-specific HID commands). In the example of computing environment 200 illustrated in FIG. 2, the lighting service 234 reads lighting commands from the OS lighting controls 238 and translates them into device-specific HID lighting commands. In an embodiment, the device-specific HID lighting commands are then used to control lighting on the device (e.g., the device-specific HID lighting commands can be used to control the color, intensity, duration, and any other suitable characteristics of lighting for the device 202).

Figure 4:
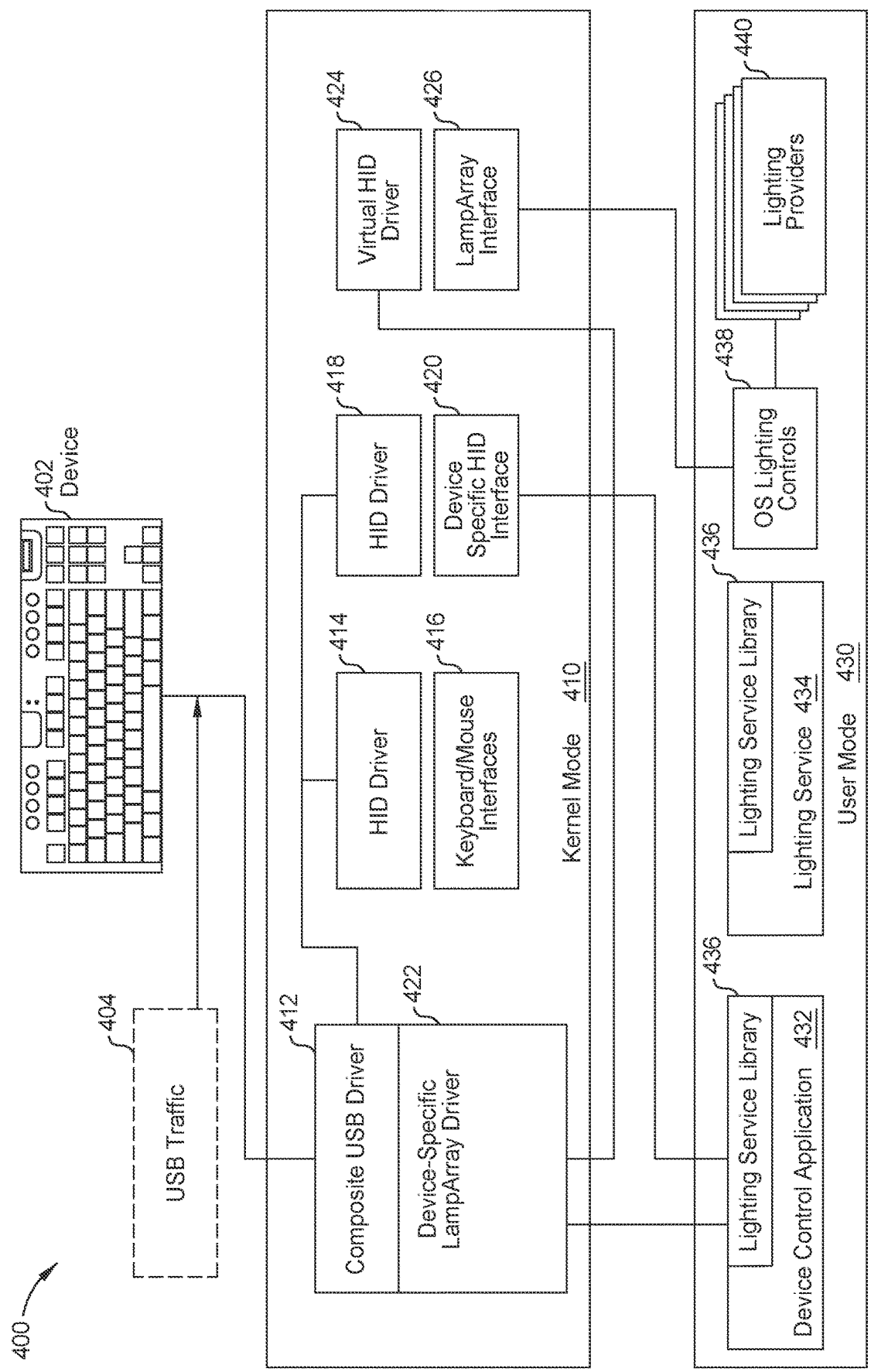
FIG. 4 illustrates a block diagram for both OS-level and higher level dynamic lighting control, according to one embodiment.

FIG. 4 illustrates a block diagram for both OS-level and higher level dynamic lighting control, according to one embodiment. In an embodiment, FIG. 4 illustrates a computing environment 400 that includes both OS level dynamic lighting control (e.g., as discussed above in relation to FIGS. 2 and 3) and higher level dynamic lighting control (e.g., using a device control application 432). As in FIGS. 1 and 2, above, in an embodiment the computing environment 400 supports a Microsoft Windows OS and includes a device 402 that that receives and transmits USB traffic 404 and supports dynamic lighting (e.g., a keyboard, a mouse, a gaming controller, an audio device or any other suitable device). Microsoft Windows is merely one example, and the techniques disclosed herein can be applied to any suitable OS and computing environment. In an embodiment, the lighting associated with the device 402 (e.g., the color(s) displayed at a given time) can be controlled by an associated computer. For example, the lighting can be controlled to match a computer gaming environment, or any other suitable computer application, to enhance the user experience.

The computing environment 400 includes a kernel mode 410 with a composite USB driver 412, HID drivers 414 and 418, keyboard/mouse interfaces 416, and device-specific HID interfaces 420. The computing environment 400 further includes OS-level dynamic lighting control through the device-specific LampArray driver 422 (e.g., a LampArray driver provided by the device manufacturer) and the OS lighting controls 438 (e.g., Windows lighting controls associated with lighting providers 440).

In an embodiment, the computing environment 400 supports both OS-level dynamic lighting controls and higher level controls, using the device control application 432 (e.g., including a lighting service library 436). For example, the device control application 432 can obtain exclusive access to the device-specific LampArray driver 422 (e.g., in place of the lighting service 434), can instruct the device-specific LampArray driver 422 to create the virtual HID driver 424, and can translate OS lighting controls 438 to device-specific HID lighting commands. This is discussed further, below, with regard to FIGS. 5-6.

Figure 5:
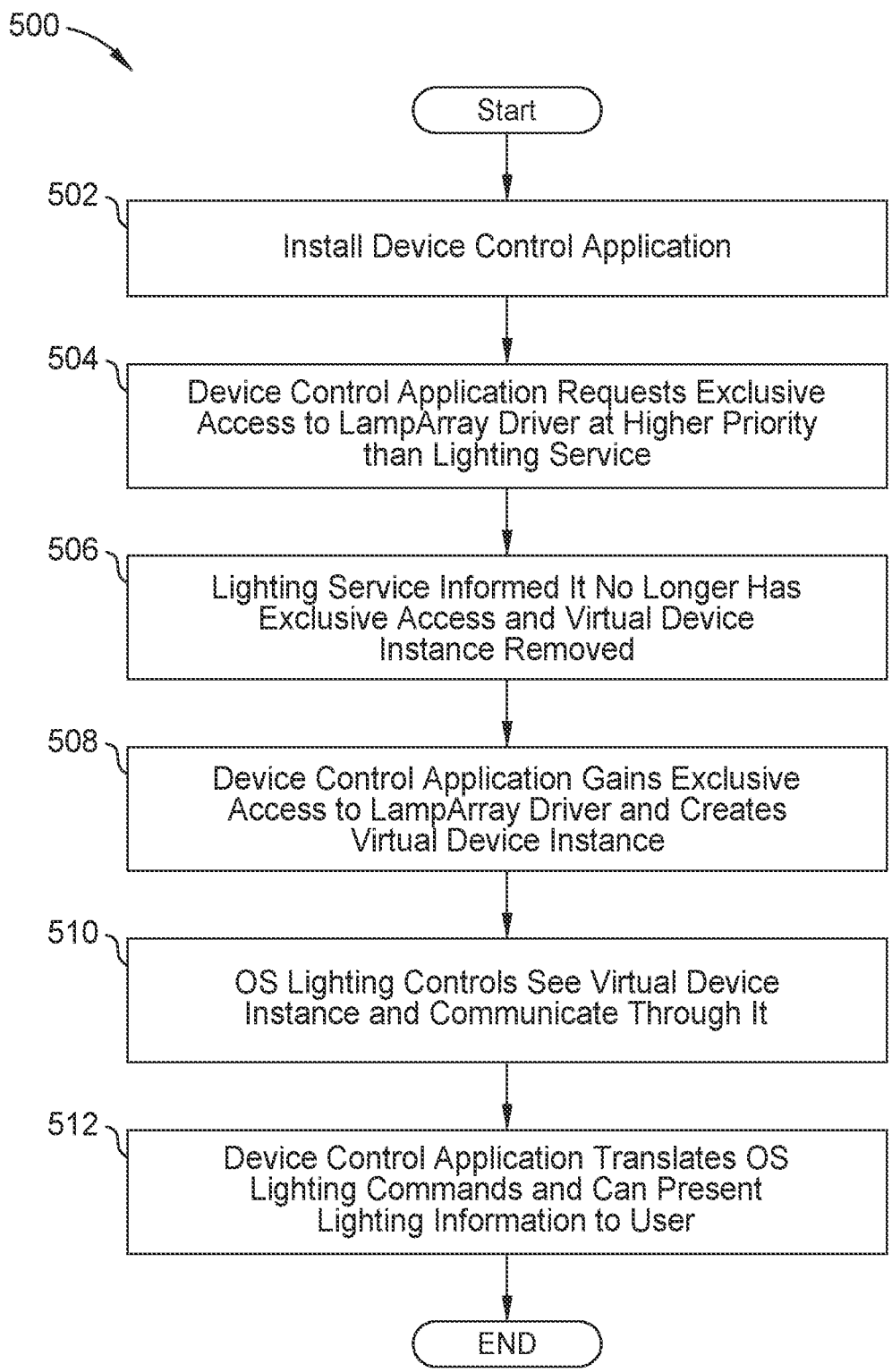
FIG. 5 is a flowchart illustrating both OS-level and higher level dynamic lighting control, according to one embodiment.

FIG. 5 is a flowchart 500 illustrating both OS-level and higher level dynamic lighting control, according to one embodiment. As discussed above, in an embodiment the flowchart 500 illustrates OS-level dynamic lighting control using the computing environment 400 illustrated in FIG. 4. At block 502, a user installs a device control application (e.g., the device control application 432 illustrated in FIG. 4). For example, a user can retrieve the device control application from a remote repository. In one embodiment, the device control application is installed automatically (e.g., when the user adds a suitable device to the computing system).

At block 504, the device control application requests exclusive access to the LampArray driver at a higher priority than the lighting service. As discussed above in relation to block 306 illustrated in FIG. 3, in an embodiment a lighting service (e.g., the lighting service 434) requests exclusive access to the LampArray driver (e.g., the device-specific LampArray driver 422 illustrated in FIG. 4). The device control application (e.g., the device control application 432 illustrated in FIG. 4) can also request exclusive access to the LampArray driver (e.g., the device-specific LampArray driver 422 illustrated in FIG. 4), at a higher priority value than the lighting service (e.g., a higher OS priority value). In an embodiment, because the device control application has higher priority than the lighting service, the device control application effectively obtains exclusive access to the LampArray driver.

At block 506, the lighting service is informed that it no longer has exclusive access and the virtual device instance is removed. For example, the LampArray driver (e.g., the device-specific LampArray driver 422) can inform the lighting service (e.g., the lighting service 434 illustrated in FIG. 4) that it no longer has exclusive access to the LampArray driver. The OS can further remove the virtual device (e.g., any virtual device previously created using the lighting service).

At block 508, the device control application gains exclusive access to the LampArray driver and creates a virtual device instance. Using the example of FIG. 4, the device control application 432 gains exclusive access to the device-specific LampArray driver 422 and creates the virtual HID driver 424.

In an embodiment, this has significant advantages. Because the device control application 432 operates using the virtual HID driver 424, it has access to both device-specific (e.g., from a device developer) and OS-level (e.g., using the OS lighting controls 438) dynamic lighting messages. This allows for easy review and debugging of dynamic lighting, by allowing the device control application access to both types of lighting control messages.

At block 510, the OS lighting controls see the virtual device instance and communicate through it. Using the computing environment 400 illustrated in FIG. 4 as an example, the OS lighting controls 438 see the virtual HID driver 424 and communicate dynamic lighting commands and data through the LampArray interface 426.

At block 512, the device control application translates OS lighting commands. In an embodiment, the device control application reads lighting commands from the OS lighting application, and translates them (e.g., into device-specific HID commands). In the example of computing environment 400 illustrated in FIG. 4, the device control application 432 reads lighting commands from the OS lighting controls 438 and translates them into device-specific HID lighting commands.

In an embodiment, the device control application can also present to the user a user interface (UI) illustrating the dynamic lighting. As discussed above in relation to block 508, the device control application has access to both device-specific (e.g., from a device developer) and OS-level (e.g., using the OS lighting controls 438) dynamic lighting messages. The device control application can use these messages to identify a state of dynamic lighting (e.g., which devices have lighting controls and what aspects of the controls are in use) and can present this information to the user.

For example, the device control application could render a model of the dynamic lighting device (e.g., a 3D model, an illustrated model, a realistic model generated using photographs of the device, or any other suitable model). The device control application could generate the model to reflect the state of dynamic lighting, and could update the model as the dynamic lighting changes (e.g., in real-time or close to real-time).

Figure 6:
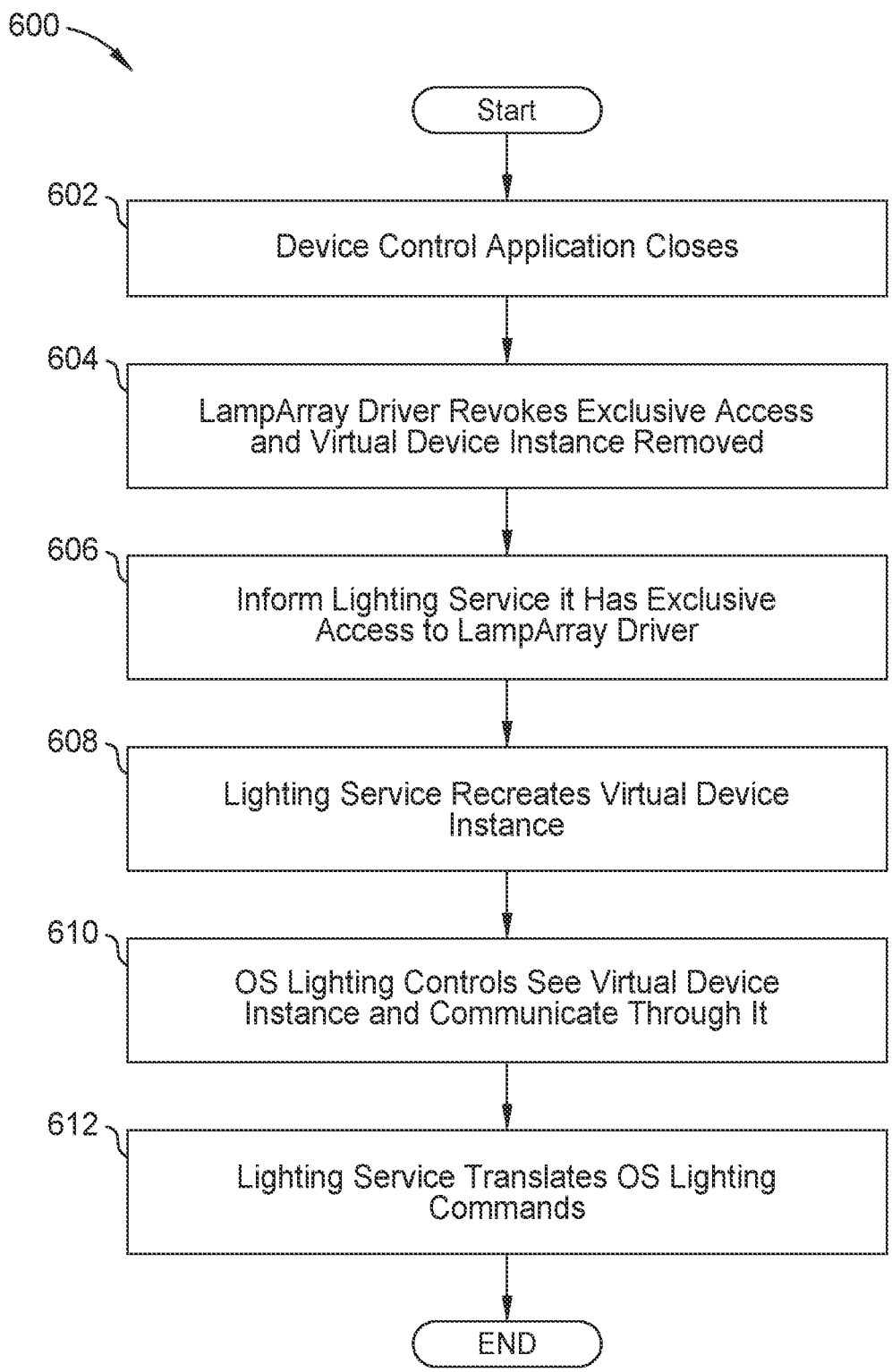
FIG. 6 is a flowcharting illustrating transitioning from higher level to OS-level dynamic lighting control, according to one embodiment.

FIG. 6 is a flowcharting 600 illustrating transitioning from higher level to OS-level dynamic lighting control, according to one embodiment. In an embodiment, FIG. 5 illustrates adding a device control application for higher level dynamic lighting control, on top of OS level controls (e.g., as illustrated in FIGS. 2-3). FIG. 6 illustrates the inverse: transitioning from using the higher level dynamic lighting control to OS level controls.

At block 602, a device control application closes (e.g., the device control application 432 illustrated in FIG. 4). For example, a user might choose to exit from the device control application or the device control application may close unintentionally (e.g., due to an error or crash).

At block 604, the LampArray driver revokes exclusive access and the virtual device instance is removed. Returning to the example of FIG. 4, the device-specific LampArray driver 422 can revoke exclusive access for the device control application 432, and can remove the virtual HID driver 424.

At block 606, the lighting service is informed that it has exclusive access to the LampArray driver. For example, the computing system or LampArray driver (e.g., the device-specific LampArray driver 422 illustrated in FIG. 4) can inform the lighting service (e.g., the lighting service 434 illustrated in FIG. 4) that the lighting service has exclusive access to the LampArray driver.

At block 608, the lighting service recreates the virtual device. For example, the lighting service 434 illustrated in FIG. 4 can create another virtual device instance (e.g., replacing the virtual HID driver 424).

At block 610, the OS lighting controls see the virtual device instance and communicate through it. Using the computing environment 400 illustrated in FIG. 4 as an example, the OS lighting controls 438 see the virtual device and communicate dynamic lighting commands and data through the LampArray interface 226.

At block 612, the lighting service translates OS lighting commands. In an embodiment, the lighting service reads lighting commands from the OS lighting controls, and translates them (e.g., into device-specific HID commands). In the example of computing environment 400 illustrated in FIG. 4, the lighting service 434 reads lighting commands from the OS lighting controls 438 and translates them into alternate lighting commands. For example, the lighting service 434 can read lighting commands from the OS lighting controls 438 and translate them into device-specific HID lighting commands, another form of device-specific lighting commands, or any other suitable commands. In an embodiment, the alternate lighting commands (e.g., the device-specific HID lighting commands) are then used to control lighting on the device (e.g., the device-specific HID lighting commands can be used to control the color, intensity, duration, and any other suitable characteristics of lighting for the device 402).

Figure 7:
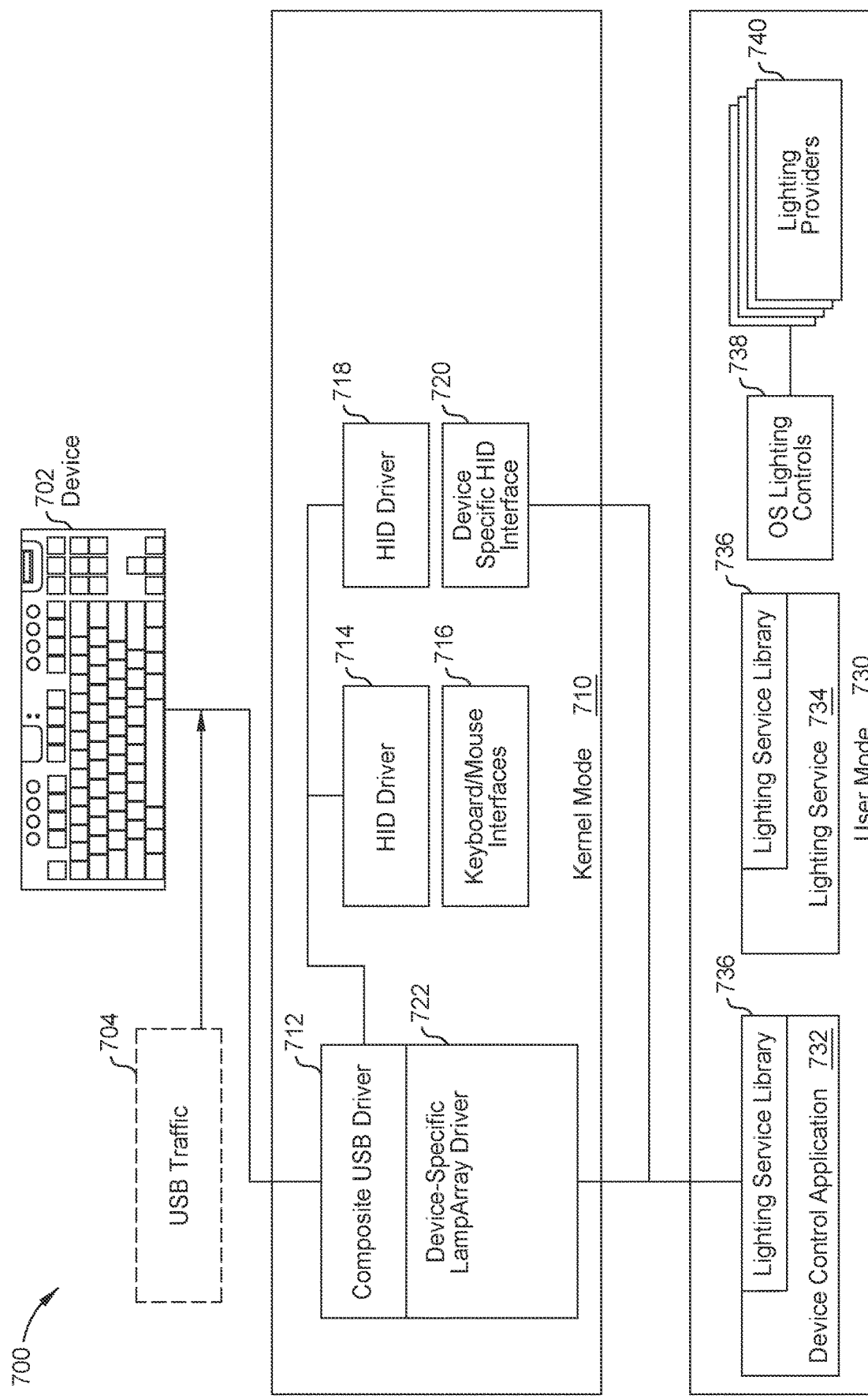
FIG. 7 illustrates a block diagram for higher level dynamic lighting control, according to one embodiment.

FIG. 7 illustrates a block diagram for higher level dynamic lighting control, according to one embodiment. In an embodiment, FIG. 7 illustrates a computing environment 700 that uses higher level dynamic lighting control (e.g., using a device control application 732 (e.g., including a lighting service library 736)) without OS-level dynamic lighting control. For example, a user may choose to use higher level lighting controls (e.g., from a device manufacturer) without OS-level control.

As in the FIGS above, in an embodiment the computing environment 700 supports a Microsoft Windows OS and includes a device 702 that that receives and transmits USB traffic 704 and supports dynamic lighting (e.g., a keyboard, a mouse, a gaming controller, an audio device or any other suitable device). Microsoft Windows is merely one example, and the techniques disclosed herein can be applied to any suitable OS and computing environment. In an embodiment, the lighting associated with the device 702 (e.g., the color(s) displayed at a given time) can be controlled by an associated computer. For example, the lighting can be controlled to match a computer gaming environment, or any other suitable computer application, to enhance the user experience.

The computing environment 700 includes a kernel mode 710 with a composite USB driver 712, HID drivers 714 and 718, keyboard/mouse interfaces 716, and device-specific HID interfaces 720. The computing environment 700 further includes lighting control support through the device specific HID interface 720 and the device control application 732.

In an embodiment, the computing environment 700 supports higher level controls using the device control application 732, and does not use OS-level controls. For example, the device control application 732 can obtain exclusive access to the device-specific LampArray driver 722 and can elect not to present a virtual device instance and LampArray interface for translating OS lighting controls 738 to device-specific HID lighting commands. This is discussed further, below, with regard to FIG. 8.

Figure 8:
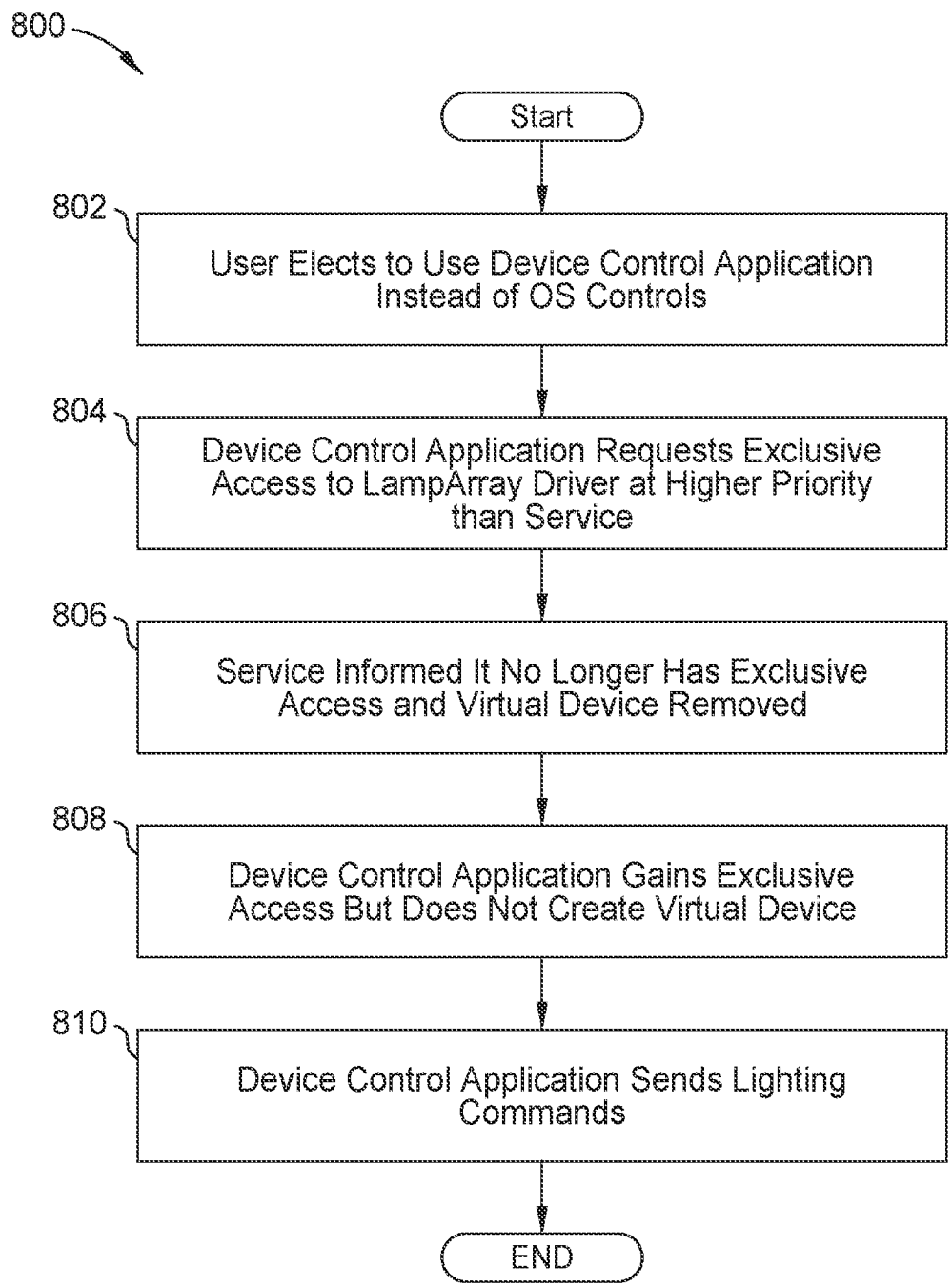
FIG. 8 is a flowchart illustrating higher level dynamic lighting control, according to one embodiment.

FIG. 8 is a flowchart 800 illustrating higher level dynamic lighting control, according to one embodiment. As discussed above, in an embodiment the flowchart 800 illustrates higher level dynamic lighting control using the computing environment 700 illustrated in FIG. 7. At block 802, a user elects to use a device control application (e.g., the device control application 732 illustrated in FIG. 7) for dynamic lighting control. For example, a user can disable OS-level dynamic lighting controls (e.g., in an OS or using a device control application).

At block 804, the device control application requests exclusive access to the LampArray driver at a higher priority than the lighting service. As discussed above in relation to block 306 illustrated in FIG. 3, in an embodiment a lighting service (e.g., the lighting service 734) requests exclusive access to the LampArray driver (e.g., the device-specific LampArray driver 722 illustrated in FIG. 7). The device control application (e.g., the device control application 732 illustrated in FIG. 7) can instead request exclusive access to the LampArray driver (e.g., the device-specific LampArray driver 722 illustrated in FIG. 7), at a higher priority value than the lighting service (e.g., a higher OS priority value). In an embodiment, because the device control application has higher priority than the lighting service, the device control application effectively obtains exclusive access to the LampArray driver.

At block 806, the lighting service is informed that it no longer has exclusive access and the virtual device instance is removed. For example, the LampArray driver (e.g., the device-specific LampArray driver 722) can inform the lighting service (e.g., the lighting service 734 illustrated in FIG. 7) that it no longer has exclusive access to the LampArray driver. The OS can further remove the virtual device (e.g., any virtual device previously created using the lighting service).

At block 808, the device control application gains exclusive access to the LampArray driver but does not create a virtual device instance. Using the example of FIG. 7, the device control application 732 gains exclusive access to the device-specific LampArray driver 722. But unlike the embodiments illustrated in FIGS. 2-6, no virtual HID driver is created. Because the device control application 732 controls dynamic lighting, and OS-level dynamic lighting control is not supported, and thus no virtual HID driver is needed.

At block 810, the device control application sends lighting commands to the device. In an embodiment, a device control application (e.g., the device control application 732) sends lighting commands to the device (e.g., the device 702). The device control application can send the commands directly, or indirectly, but in an embodiment the OS-level dynamic lighting controls are not used.

ADDITIONAL CONSIDERATIONS

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a computer, a special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
obtaining exclusive access to a device driver for a dynamic lighting device;
instructing the device driver to create a virtual device instance for the dynamic lighting device;
controlling dynamic lighting for the dynamic lighting device using the device driver and the virtual device instance, comprising:
receiving at the virtual device instance dynamic lighting data from one or more operating system (OS) dynamic lighting controls; and
translating OS dynamic lighting commands for a device specific interface relating to the dynamic lighting device; and
transmitting a request for exclusive access from a lighting service to the device driver,
wherein the lighting service instructs the device driver to create the virtual device instance, and
wherein the lighting service translates the OS dynamic lighting commands for the device specific interface.

2. The computer-implemented method of claim 1,
wherein the lighting service is implemented in a user mode of the OS, and
wherein the device driver and the virtual device instance are implemented in a kernel mode of the OS.

3. The computer-implemented method of claim 1, further comprising:
requesting exclusive access for a device control application to the device driver;
informing the lighting service that it no longer has exclusive access to the device driver;
removing the virtual device instance; and
instructing, by the device control application, the device driver to create a second virtual device instance for the dynamic lighting device.

4. The computer-implemented method of claim 3, further comprising:
controlling dynamic lighting for the dynamic lighting device using the device driver and the second virtual device instance,
wherein the device control application translates OS dynamic lighting commands for the device specific interface.

5. The computer-implemented method of claim 3, wherein a request for exclusive access for the device control application is at a higher priority value than the request for exclusive access from the lighting service.

6. The computer-implemented method of claim 3, further comprising:
generating a user-interface displaying a state of the dynamic lighting device for a user, using the device control application and the virtual device instance.

7. The computer-implemented method of claim 3, further comprising:
determining that the device control application has closed;
revoking exclusive access for the device control application and the device driver;
removing the second virtual device instance;
informing the lighting service that it has exclusive access to the device control application; and
instructing the device driver to create a third virtual device instance, relating to the lighting service.

8. A computer-implemented method, comprising:
obtaining exclusive access to a device driver for a dynamic lighting device;
instructing the device driver to create a virtual device instance for the dynamic lighting device;
controlling dynamic lighting for the dynamic lighting device using the device driver and the virtual device instance, comprising:
receiving at the virtual device instance dynamic lighting data from one or more operating system (OS) dynamic lighting controls; and
translating OS dynamic lighting commands for a device specific interface relating to the dynamic lighting device; and
transmitting a request for exclusive access from a device control application to the device driver,
wherein the device control application instructs the device driver to create the virtual device instance, and
wherein the device control application translates the OS dynamic lighting commands for the device specific interface.

9. The computer-implemented method of claim 1,
wherein the OS is a Microsoft Windows OS,
wherein the device driver is a LampArray driver, and
wherein the OS dynamic lighting controls are Microsoft Windows lighting controls.

10. A system, comprising:
one or more processors;
one or more memories storing a program, which, when executed on any combination of the one or more processors, performs operations, the operations comprising:
obtaining exclusive access to a device driver for a dynamic lighting device;
instructing the device driver to create a virtual device instance for the dynamic lighting device;
controlling dynamic lighting for the dynamic lighting device using the device driver and the virtual device instance, comprising:
receiving at the virtual device instance dynamic lighting data from one or more operating system (OS) dynamic lighting controls; and
translating OS dynamic lighting commands for a device specific interface relating to the dynamic lighting device; and
transmitting a request for exclusive access from a lighting service to the device driver,
wherein the lighting service instructs the device driver to create the virtual device instance, and
wherein the lighting service translates the OS dynamic lighting commands for the device specific interface.

11. The system of claim 10,
wherein the lighting service is implemented in a user mode of the OS, and
wherein the device driver and the virtual device instance are implemented in a kernel mode of the OS.

12. The system of claim 10, the operations further comprising:
requesting exclusive access for a device control application to the device driver;
informing the lighting service that it no longer has exclusive access to the device driver;
removing the virtual device instance; and
instructing, by the device control application, the device driver to create a second virtual device instance for the dynamic lighting device.

13. The system of claim 12, the operations further comprising:
determining that the device control application has closed;
revoking exclusive access for the device control application and the device driver;
removing the second virtual device instance;
informing the lighting service that it has exclusive access to the device control application; and
instructing the device driver to create a third virtual device instance, relating to the lighting service.

14. A non-transitory computer-readable medium containing computer program code that, when executed by operation of one or more computer processors, performs operations comprising:
obtaining exclusive access to a device driver for a dynamic lighting device;
instructing the device driver to create a virtual device instance for the dynamic lighting device;
controlling dynamic lighting for the dynamic lighting device using the device driver and the virtual device instance, comprising:
receiving at the virtual device instance dynamic lighting data from one or more operating system (OS) dynamic lighting controls; and translating OS dynamic lighting commands for a device specific interface relating to the dynamic lighting device; and transmitting a request for exclusive access from a lighting service to the device driver,
- wherein the lighting service instructs the device driver to create the virtual device instance, and
- wherein the lighting service translates the OS dynamic lighting commands for the device specific interface.

15. The non-transitory computer-readable medium of claim 14, wherein the lighting service is implemented in a user mode of the OS, and wherein the device driver and the virtual device instance are implemented in a kernel mode of the OS.

16. The non-transitory computer-readable medium of claim 14, the operations further comprising: requesting exclusive access for a device control application to the device driver; informing the lighting service that it no longer has exclusive access to the device driver; removing the virtual device instance; and instructing, by the device control application, the device driver to create a second virtual device instance for the dynamic lighting device.

17. The non-transitory computer-readable medium of claim 16, the operations further comprising:
- determining that the device control application has closed;
- revoking exclusive access for the device control application and the device driver;
- removing the second virtual device instance;
- informing the lighting service that it has exclusive access to the device control application; and
- instructing the device driver to create a third virtual device instance, relating to the lighting service.

* * * * *